US006185347B1

United States Patent
Zheng

(10) Patent No.: US 6,185,347 B1
(45) Date of Patent: Feb. 6, 2001

(54) WAVELENGTH DIVISION MULTIPLEXED COUPLER

(76) Inventor: Yu Zheng, 1095 E. Duane Ave., Suite 107, Sunnyvale, CA (US) 94086

(*) Notice: Under 35 U.S.C. 154(b), the term of this patent shall be extended for 0 days.

(21) Appl. No.: 09/300,874

(22) Filed: Apr. 20, 1999

(51) Int. Cl.[7] .................................................. G02B 6/32
(52) U.S. Cl. .............................. 385/34; 385/33; 385/16; 385/74
(58) Field of Search ................................ 385/34, 31–37, 385/16, 27, 24, 43, 14, 39, 47, 74, 88, 89, 92, 93

(56) References Cited

U.S. PATENT DOCUMENTS

| 5,889,904 | * | 3/1999 | Pan et al. ................................ 385/24 |
| 6,084,994 | * | 7/2000 | Li et al. ................................... 385/31 |

* cited by examiner

Primary Examiner—Phan T. H. Palmer
(74) Attorney, Agent, or Firm—Bo-In Lin

(57) ABSTRACT

The present invention discloses an improved wavelength division multiplexed (WDM) coupler comprising a dual fiber collimator and a single fiber collimator. First, the dual fiber collimator includes a WDM filter attached to a first GRIN lens by applying a first heat-curing epoxy. The dual fiber collimator further includes the first GRIN lens inserted and fixed into a first holding tube by applying a second heat-curing epoxy. The dual fiber collimator further includes a second holding tube disposed on a dual fiber pigtail. When the dual fiber pigtail is disposed at a first optimal position from the first GRIN lens to achieve a lowest reflection loss, the first and second holding tubes and the dual fiber pigtail are fixed together by applying a third heat-curing epoxy. Secondly, the single fiber collimator includes a third holding tube holding and fixing a second GRIN lens and a single fiber pigtail therein by applying a fourth and a fifth heat-curing epoxies with the single fiber pigtail disposed at a second optimal position from the second GRIN lens to achieve a lowest transmission loss. Finally, the dual and single fiber collimators are bonded together by applying a sixth heat-curing epoxy to fix the first and third holding tubes together when the dual fiber collimator is disposed at a third optimal position from the single fiber collimator to achieve a lowest overall transmission loss.

34 Claims, 4 Drawing Sheets

WAVELENGTH DIVISION MULTIPLEXED COUPLER

FIELD OF THE INVENTION

This invention relates generally to a method and system for use in optical fiber technology. More particularly, this invention relates to a method and system for manufacturing an improved wavelength division multiplexed coupler.

BACKGROUND OF THE INVENTION

In optical fiber technology, wavelength division multiplexed (WDM) couplers are used to combine or separate optical signals having different wavelengths. As the WDM couples are being more broadly applied in the telecommunications, data communications and CATV industries, the fiber optic component industry is now confronted with increasing requirements for WDM couplers with higher level of performance and reliability.

The performance and reliability of the WDM couplers depend heavily on their design and packaging technologies. Currently, two major kinds of design and packaging technologies are being widely employed in manufacturing the WDM couplers and each kind has its own advantages and disadvantages. In applying a first kind of technology for designing and packaging the WDM couplers, all optical parts are bonded together by applying epoxy bonding. The applications of this first type of WDM couplers show potential reliability risk of epoxy bonding in long-term operation. In the present invention, improvements over this type of WDM couplers are disclosed.

FIG. 1 shows the structure of a typical WDM coupler manufactured according to the first kind of design and packaging technology based on epoxy bonding. The WDM coupler includes a dual fiber pigtail 25, a GRIN lens 35, a WDM filter 40, a GRIN lens 50, and a single fiber pigtail 60. In a typical manufacturing process, the GRIN lens 35, the WDM filter 40 and the GRIN lens 50 are first fixed together by applying a heat-curing epoxy 45. The relative position of the GRIN lens 35 to the fiber pigtail 25 is adjusted to achieve a lowest transmission loss from the input fiber 15 to the output fiber 20 for optical signals having reflection wavelengths. Then the dual fiber pigtail 25 is fixed to the GRIN lens 35 by applying a heat-curing epoxy 30. Then the relative position of the GRIN lens 50 to the fiber pigtail 60 is adjusted to achieve a lowest transmission loss from the input fiber 15 to the output fiber 65 for optical signals having transmission wavelengths. And then, the single fiber pigtail 60 is fixed to the GRIN lens 50 by applying a heat-curing epoxy 55. The conventional method and system provides the WDM couplers with good performance and reliability suitable for many types of applications. However, the WDM couplers manufactured according to the conventional method and system have a risk of failure when they are applied in high power optical transmission systems. In general, the heat-curing epoxies inevitably spread over all the optical paths in the WDM couplers. More specifically, the heat-curing epoxies 30, 45 and 55 spread over the optical paths between the dual fiber pigtail 25 and the GRIN lens 35, between the GRIN lenses 35, 50 and the WDM filter 40 and between the GRIN lens 50 and the single fiber pigtail 60, respectively. Under long-term operation, the epoxies 30, 45 and 55 when exposed to the transmitted optical signals may gradually become degraded and susceptible to damages and thus lead to unreliable performance after continuously absorbing the optical signal energy. In the typical WDM coupler, the diameter of the optical signal beam is changing from about 10 m at the epoxy 30 to about 450 m at the epoxy 45 to about 10m at the epoxy 55. Thus, the optical signal power densities at the epoxies 30 and 55 are about 2500 times higher than that at the epoxy 45. Therefore, the risk for high optical power damage is significantly higher at the epoxies 30 and 55 than at the epoxy 45. The difficulties are specially pronounced for transmission of optical signals of high power. Because of the heat absorption problem, many optical system designers and operators now prefer or even demand to have all optical paths of the WDM couplers epoxy-free. Due to the significantly high power density and thus reliability risk, as the first step toward all epoxy-free optical paths, the optical system designers and operators now require not to use any epoxy on the optical paths between the GRIN lenses and the fiber pigtails. However, by applying the conventional WDM method and system, this epoxy-free optical path requirement can not be easily achieved. Thus, further development of reliable fiber optic components with high level of performance and reliability is limited by these difficulties.

Therefore, a need still exists in the art of design and manufacturing of the WDM couplers to provide new material compositions, device structure, and manufacturing processes to overcome the difficulties discussed above. Specifically, a technique to provide the WDM couplers with all optical paths epoxy-free is required. As the first step to fully overcome the above-discussed difficulties, a technique to provide the WDM couplers with epoxy-free optical paths between the GRIN lenses and the fiber pigtails is required.

SUMMARY OF THE PRESENT INVENTION

It is therefore an object of the present invention to provide a new design and process for fabricating a WDM coupler with improved reliability by preventing the epoxies to spread over or diffused into the optical paths between the GRIN lenses and the fiber pigtails. By eliminating the epoxies from the optical paths between the GRIN lenses and the fiber pigtails, the aforementioned difficulties and limitations in the prior art can be significantly improved.

Specifically, it is an object of the present invention to provide a design and process to fix all optical parts together by applying heat-curing epoxies. Several holding tubes are used between the GRIN lenses and the fiber pigtails to prevent the heat-curing epoxies from spreading over or diffused to the optical paths between the GRIN lenses and the fiber pigtails of the WDM couplers. As a result, the optical paths between the GRIN lenses and the fiber pigtails are epoxy-free according to the new method and system of the WDM couplers of this invention. The WDM couplers produced according to the presently improved design and process have significantly reduced risk of high optical power damage. Therefore, the WDM couplers of this invention can be employed in fiber optic components for broadened applications with being much less limited by the reliability problems of the WDM couplers as that encountered in the prior art.

Briefly, in a preferred embodiment, the present invention discloses a WDM coupler comprising a dual fiber collimator and a single fiber collimator. First, the dual fiber collimator includes a WDM filter attached to a first GRIN lens by applying a first heat-curing epoxy. The dual fiber collimator further includes the first GRIN lens inserted an fixed into a first holding tube by applying a second heat-curing epoxy. The dual fiber collimator further includes a second holding tube holding a dual fiber pigtail. The dual fiber pigtail is disposed at a first optimal position from the first GRIN lens to achieve a lowest reflection loss. The first and second holding tubes are in contact with each other. The dual fiber pigtail held by the second holding tube and the first holding tube are fixed together by applying a third heat-curing epoxy. The WDM coupler further includes a single fiber collimator that includes a third holding tube holding and fixing a second GRIN lens and a single fiber pigtail therein by applying a fourth and a fifth heat-curing epoxies. The single fiber pigtail is disposed at a second optimal position from the second GRIN lens to achieve a lowest transmission loss. The dual and single fiber collimators are bonded together by applying a sixth heat-curing epoxy to fix the first and third holding tubes together. The dual fiber collimator is aligned with the single fiber collimator with the first and the third holding tubes securely bonded together by the sixth heat-curing epoxy.

The present invention further discloses a method for fabricating a WDM coupler. The method includes the steps of: a) attaching a WDM filter to a first GRIN lens by applying a first heat-curing epoxy; b) inserting and fixing the first GRIN lens with the WDM filter into a first holding tube having a length slightly longer than the combined length of the first GRIN lens and the WDM filter by applying a second heat-curing epoxy; c) inserting a dual fiber pigtail into a second holding tube then adjusting a relative position between the dual fiber pigtail and the first GRIN lens on an alignment stage to achieve a lowest reflection loss; d) sliding the second holding tube along the dual fiber pigtail without moving the dual fiber pigtail until the first and second holding tubes are in contact then fixing and the first and second holding tubes and the dual fiber pigtail together by applying a third heat-curing epoxy; e) inserting and fixing a second GRIN lens into a third holding tube by applying a fourth heat-curing epoxy; f) mounting the third holding tube with the second GRIN lens on an alignment stage then inserting a single fiber pigtail into the third holding tube and adjusting and fixing the single fiber pigtail to an optimal position in the third holding tube from the second GRIN lens by applying a fifth heat-curing epoxy; g) adjusting a relative position of the first GRIN lens to the second GRIN lens on an alignment stage until both a lowest transmission loss is achieved with the first and third holding tubes being in contact; and h) fixing the first and third holding tubes together by applying a sixth heat-curing epoxy.

These and other objects and advantages of the present invention will no doubt become obvious to those of ordinary skill in the art after having read the following detailed description of the preferred embodiment which is illustrated in the various drawing figures.

DETAILED DESCRIPTION OF THE PREFERRED EMBODIMENT

The present invention discloses a WDM coupler that includes major parts of the fiber pigtails, the GRIN lenses and the WDM filter. These parts are fixed together by applying heat-curing epoxies while the epoxies employed for bonding are prevented from spreading over the optical paths between the GRIN lenses and the fiber pigtails. To prevent the heat-curing epoxies from spreading over the optical paths between the GRIN lenses and the fiber pigtails when they are applied, holding tubes are employed.

Figure 1:
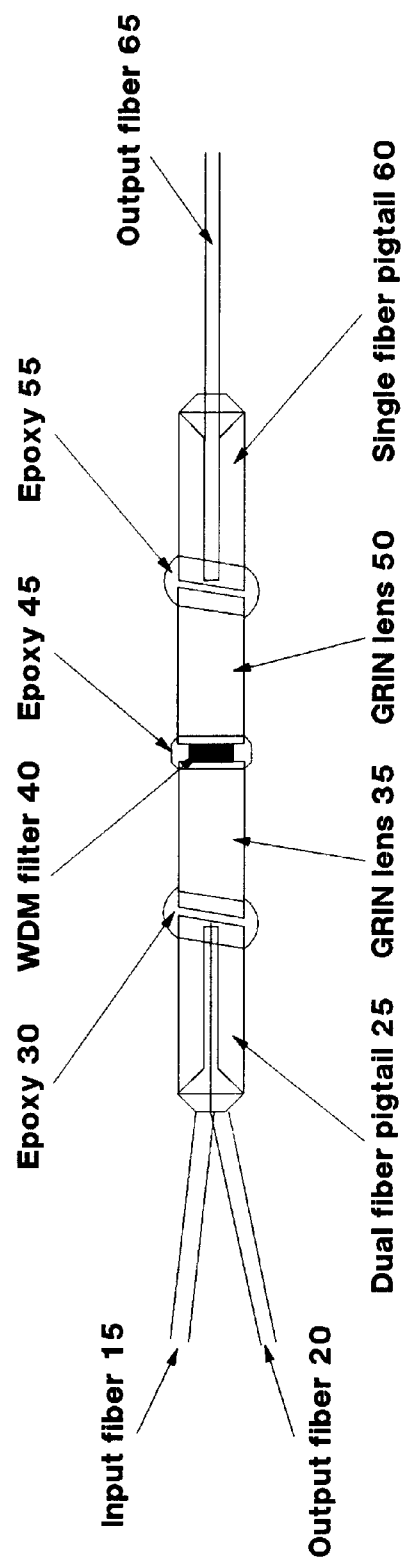
FIG. 1 is a cross sectional view of a conventional WDM coupler made according to the design and packaging technology based on epoxy bonding.
Figure 2A:
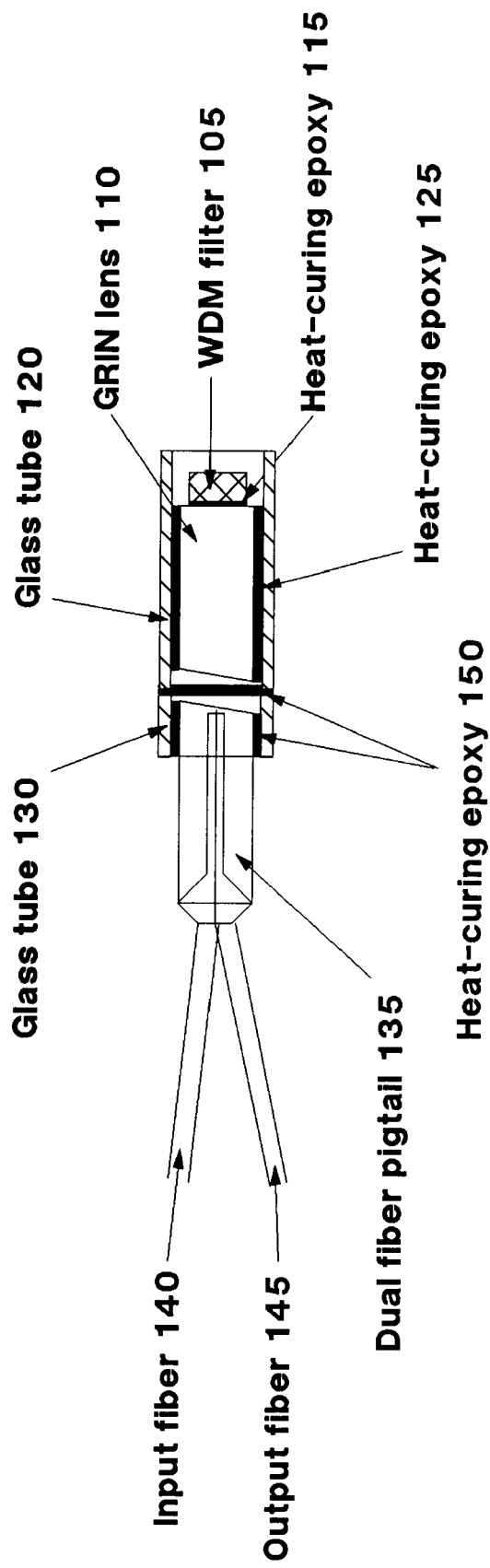
FIGS. 2A to 2C are cross sectional view of the WDM coupler for illustrating the fabrication steps for making a WDM coupler of this invention.
Figure 2B:
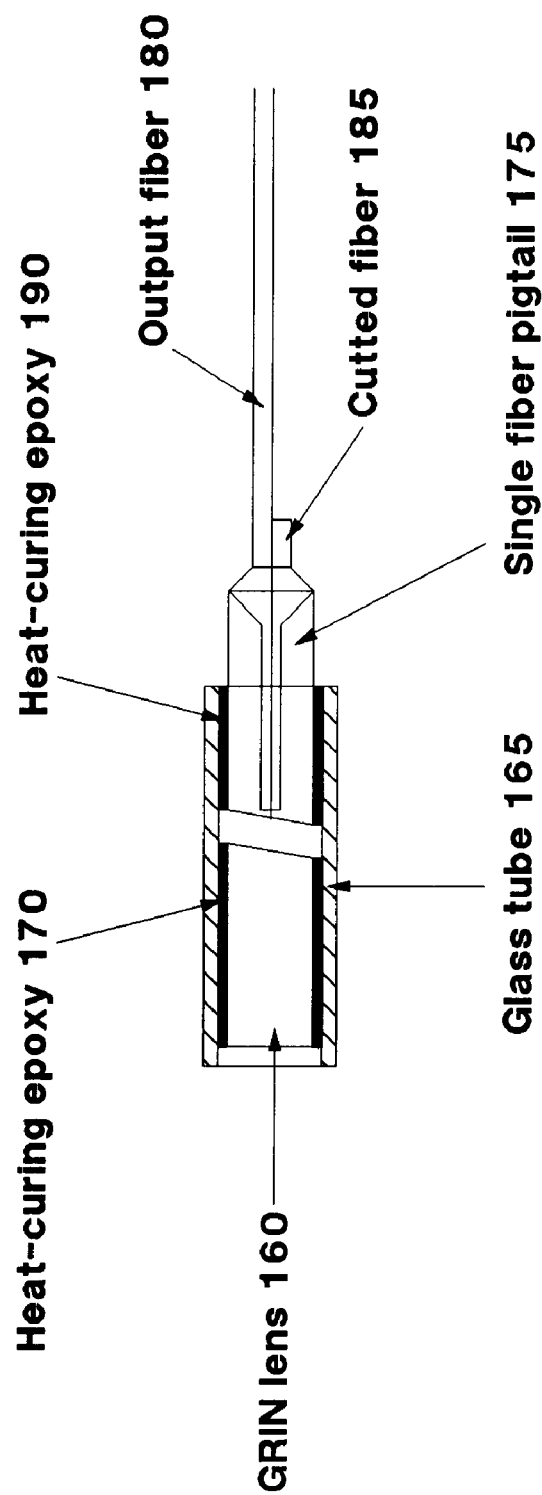
Figure 2C:
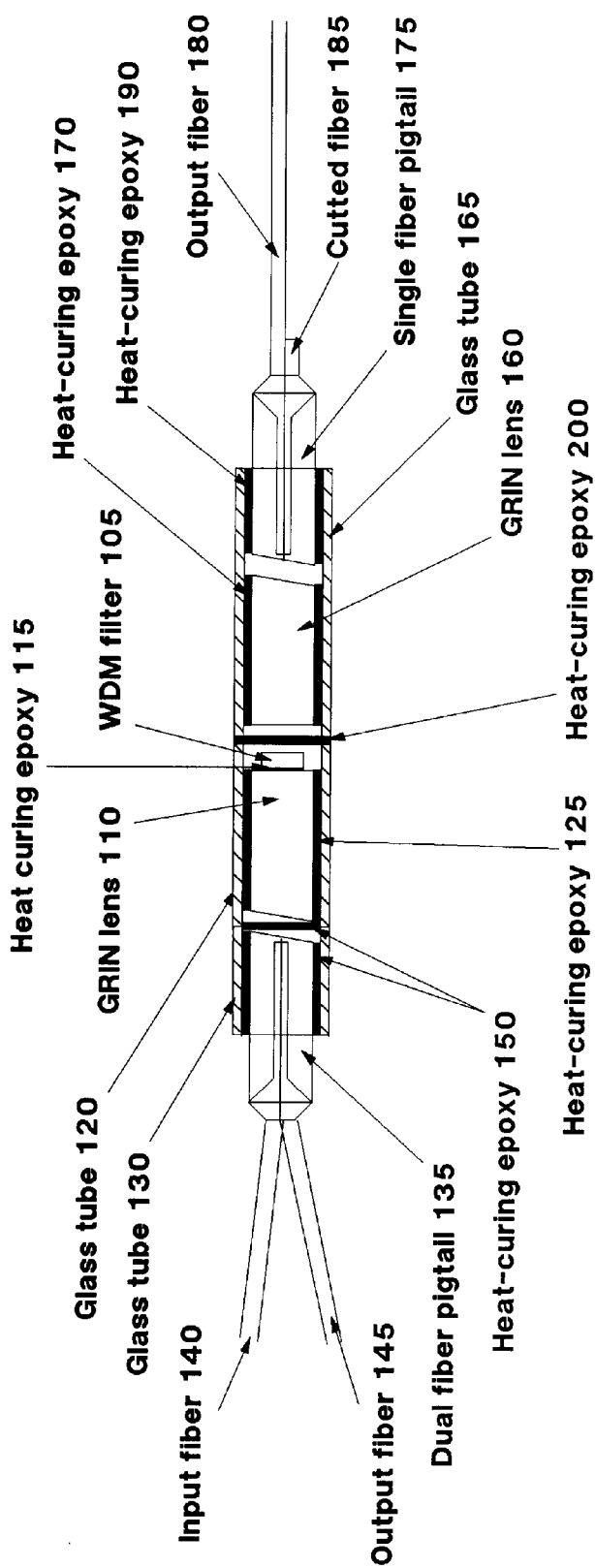

Please refer to FIGS. 2A to 2C for discussion of the materials and the fabrication processes employed to provide an improved WDM coupler 100 of this invention. In FIG. 2A, a WDM filter 105 is attached to a first GRIN lens 110 by applying a first heat-curing epoxy 115. The epoxy 115 will enter the interface between the WDM filter 105 and the first GRIN lens 110 and thus provides a very reliable bonding with good humidity resistance. Then the first GRIN lens 110 with the WDM filter 105 is inserted and fixed into a first holding tube 120 having a length slightly longer than the combined length of the WDM filter 105 and the first GRIN lens 110 by applying a second heat-curing epoxy 125. After a second holding tube 130 is mounted onto a dual fiber pigtail 135, the filter 105/lens 110/tube 120 sub-assembly and the fiber pigtail 135 with the holding tube 130 are mounted on an alignment stage (not shown). Then a distance and orientation of the fiber pigtail 135 relative to the GRIN lens 110 is adjusted to achieve a lowest reflection loss from the input fiber 140 to the output fiber 145. After the fiber pigtail 135 is placed at its optimal position relative to the GRIN lens 110, the position of the holding tube 130 is adjusted so that its end surface is in contact with that of the holding tube 120. Then a third heat-curing epoxy 150 is applied to fix the fiber pigtail 135 and the two holding tubes 120 and 130 together and thus an assembly of a dual fiber collimator 155 is completed. After the epoxy 150 is applied, it will spread over all contact areas between the holding tube 130 and the fiber pigtail 135 and between the holding tubes 120 and 130. Because of surface tension, it will not contaminate the optical path between the GRIN lens 110 and the fiber pigtail 135.

Referring now to FIG. 2B, a second GRIN lens 160 is inserted and fixed into a holding tube 165 by applying a fourth heat-curing epoxy 170. Then the holding tube 165 with the second GRIN lens 160 is mounted on an alignment stage (not shown). A single fiber pigtail 175 is inserted into the holding tube 165. The single fiber pigtail 175 is made from a dual fiber pigtail by cutting off one of the two fibers 180 and 185. A pigtail position-adjustment is made on the alignment stage to achieve an optimal distance of the fiber pigtail 175 from the second GRIN lens 160 with a lowest transmission loss. After the fiber pigtail 175 is placed at its optimal position, a fifth heat-curing epoxy 190 is applied to fix the fiber pigtail 175 to the holding tube 165 and then an assembly of a single fiber collimator 195 is completed. The epoxy 190 is prevented from spreading over or being diffused into the optical path between the GRIN lens 160 and the fiber pigtail 175 because of surface tension over the interface areas between the holding tube 165, the fiber pigtail 175 and the GRIN lens 160. Since the fiber pigtail 175 is made from a dual fiber pigtail by cutting off one of the two fibers, the single fiber collimator 195 has the same optical signal outgoing orientation as the dual fiber collimator 155.

Referring to FIG. 2C, the dual fiber collimator 155 and the single fiber collimator 195 are mounted on an optical alignment stage (not shown). The relative position of the dual fiber collimator 155 and the single fiber collimator 195 are adjusted until both a lowest transmission loss from the input fiber 140 to the output fiber 180 is achieved and the first and third holding tubes 120 and 165 are in good contact. Note that since the dual fiber collimator 155 and the single fiber collimator 195 have the same optical signal transmission orientation, the end surfaces of the first and third holding tubes 120 and 165 can be adjusted to be in good contact when the lowest transmission loss is achieved. Then a sixth heat-curing epoxy 200 is applied to fix the first and third holding tubes 120 and 165 together and an assembly of the WDM coupler 100 is finally completed. The epoxy 200 will permeates the whole contact areas between the first and third holding tubes 120 and 165. By assembling a WDM coupler according to the above method and system, two GRIN lenses of 0.23 pitch are implemented as the first GRIN lens 110 and the second GRIN lens 160. The use of 0.23-pitch GRIN lenses is to provide an optimal gap of about 0.2 mm between the GRIN lenses and the fiber pigtails, which will prevent heat-curing epoxies from entering the optical paths between the GRIN lenses and the fiber pigtails due to surface tension. In the present invention, the lengths of the holding tubes 120, 130 and 165 are chosen as about 5.7 mm, 3 mm and 9 mm, respectively. The inside diameters of the holding tubes 120, 130 and 165 are chosen to match with those of the GRIN lenses 110, 160 and the fiber pigtails 135, 175., i.e., 1.8 mm. The outside diameters of the holding tubes are chosen as about 2.8 mm. In a preferred embodiment, the first, second and third holding tubes are preferably glass tubes which have about the same thermal expansion coefficients as the GRIN lenses and the fiber pigtails. In a preferred embodiment, the first, second, third, fourth, fifth and sixth heat-curing epoxies are preferably a 353ND heat-curing epoxy from Epoxy Technology Inc. located in Billerica, Massachusetts because it has very good glass-to-glass bonding strength, thermal stability and humidity reliability.

According to FIGS. 2A to 2C and the above description, this present invention discloses a WDM coupler. The WDM coupler includes a dual fiber collimator held in a first and a second holding tubes. The WDM coupler further includes a single fiber collimator held in a third holding tube wherein the first holding tube and third holding tube are in contact and bonded with an epoxy with the dual fiber collimator aligned with the single fiber collimator. In a preferred embodiment, the single fiber pigtail is formed by cutting off one of two fibers pigtails of a dual fiber pigtail. In a preferred embodiment, the first, second and third holding tubes are glass holding tubes. In another preferred embodiment, the epoxies are heat-curing epoxies. In another preferred embodiment, the heat curing epoxies are a 353ND heat-curing epoxy.

In summary, this invention discloses an optical device includes a plurality of optical parts for processing an optical signal transmission therein. The device includes a plurality of gaps each having an adjusted distance between the plurality of optical parts. The device further includes two holding tubes holding two of the plurality of optical parts and the holding tubes are in contact with each other in at least one of the gaps. The device further includes an epoxy applied over contact area between two of the holding tubes over one of the gaps for securely bonding the holding tubes holding the plurality of optical parts. In a preferred embodiment, the holding tubes over at least one of the gaps between the optical parts are glass holding tubes. In a preferred embodiment, the epoxy applied over the contact area between two of the holding tubes over one of the gaps for securely bonding the holding tubes holding the plurality of optical parts is a heat-curing epoxy.

According to FIGS. 2A to 2C and the above descriptions, this invention discloses a method for fabricating a WDM coupler. The method includes the steps of: a) attaching a WDM filter to a first GRIN lens by applying a first heat-curing epoxy; b) inserting and fixing the first GRIN lens with the WDM filter into a first holding tube having a length slightly longer than the combined length of the first GRIN lens and the WDM filter by applying a second heat-curing epoxy; c) inserting a dual fiber pigtail into a second holding tube then adjusting a relative position between the dual fiber pigtail and the first GRIN lens on an alignment stage to achieve a lowest reflection loss; d) sliding the second holding tube along the dual fiber pigtail without moving the dual fiber pigtail until the first and second holding tubes are in contact then fixing the first and second holding tubes and the dual fiber pigtail together by applying a third heat-curing epoxy; e) inserting and fixing a second GRIN lens into a third holding tube by applying a fourth heat-curing epoxy; f) mounting the third holding tube with the second GRIN lens on an alignment stage then inserting a single fiber pigtail into the third holding tube and adjusting and fixing the single fiber pigtail to an optimal position in the third holding tube from the second GRIN lens by applying a fifth heat-curing epoxy; g) adjusting a relative position of the first GRIN lens to the second GRIN lens on an alignment stage until both a lowest transmission loss is achieved and the first and third holding tubes are in contact; and h) fixing the first and third holding tubes together by applying a sixth heat-curing epoxy.

Therefore, the present invention discloses a new design and process for fabricating a WDM coupler with improved reliability. The difficulties and limitations in the prior art are in large part overcome. Specifically, this invention discloses a fabrication process to fix the WDM couplers by applying heat-curing epoxies to produce the WDM couplers with better reliability in long-term high power operation. Holding tubes are used between the fiber pigtails and the GRIN lenses to prevent the heat-curing epoxies from spreading over the optical paths between the GRIN lenses and the fiber pigtails. Therefore, the improved WDM couplers can be employed in fiber optic components for broaden applications with being much less limited by the reliability problems caused by the difficulty of epoxy degradation when continuously exposed to the high power transmitted optical signals as that encountered in the prior art.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

I claim:

1. A WDM coupler comprising:
   a first GRIN lens attached to a WDM filter via a first epoxy;
   a first holding tube holding and securely bonding to said first GRIN lens with a second epoxy;
   a dual optical fiber pigtail disposed at a first optimal gap from said first GRIN lens to achieve a lowest reflection loss;
   a second holding tube holding and securely bonding to said dual optical fiber pigtail with a third epoxy and said first and second holding tubes being further securely bonding to each other with said third epoxy for maintaining said first optimal gap between said first GRIN lens and said dual fiber pigtail;
   a single fiber pigtail disposed at a second optimal distance from a second GRIN lens and a third holding tube holding and securely boding to said single fiber pigtail and said second GRIN lens therein with a fourth and a fifth epoxies for maintaining said second optimal distance;

said first holding tube holding said first GRIN lens in physical contact and securely boding to said third holding tube holding said second GRIN lens with a sixth epoxy wherein said first GRIN lens is aligned with said second GRIN lens.

2. The WDM coupler of claim 1 wherein:
said first, second, third, fourth, fifth and sixth epoxies are a 353ND epoxy.

3. The WDM coupler of claim 1 wherein:
said first, second and third holding tubes are a first, a second and a third glass tubes.

4. The WDM coupler of claim 1 wherein:
said first, second and third holding tubes are a first, second and third holding tubes having lengths of from 3 to 9 mm with an inside diameter of about 1.8 mm and an outside diameter of about 2.8 mm.

5. The WDM coupler of claim 1 wherein:
said third holding tube is a glass tube.

6. The WDM coupler of claim 1 wherein:
said third holding tube is a holding tube having a length of about 9 mm with an inside diameter of about 1.8 mm and an outside diameter of about 2.8 mm.

7. The WDM coupler of claim 1 wherein:
said first and said second GRIN lenses are GRIN lenses of 0.23 pitch.

8. The WDM coupler of claim 1 wherein:
said single fiber pigtail is a dual fiber pigtail with one of its two fibers cut off.

9. An optical device includes a plurality of optical parts for processing an optical signal transmission therein, comprising:
a plurality of gaps each having an adjusted distance between said plurality of optical parts;
two holding tubes holding two of said plurality of optical parts and said holding tubes are in contact with each other in at least one of said gaps; and
an epoxy applied over contact area between two of said holding tubes over one of said gaps for securely bonding said holding tubes holding said plurality of optical parts.

10. The optical device of claim 9 wherein:
said holding tubes over at least one of said gaps between said optical parts are glass holding tubes.

11. The optical device of claim 9 wherein:
said epoxy applied over said contact area between two of said holding tubes over one of said gaps for securely bonding said holding tubes holding said plurality of optical parts is a heat-curing epoxy.

12. The optical device of claim 11 wherein:
said heat-curing epoxy is a 353ND heat-curing epoxy.

13. The optical device of claim 9 wherein:
one of said optical parts is a single fiber pigtail formed by cutting off one of two fibers pigtail of a dual fiber pigtail.

14. A WDM coupler comprising:
a dual fiber collimator held in a first and a second holding tubes; and
a single fiber collimator held in a third holding tube wherein said first holding tube and third holding tube are in contact and bonded with an epoxy with said dual fiber collimator aligned with said single fiber collimator.

15. The WDM coupler of claim 14 wherein:
said single fiber pigtail is formed by cutting off one of two fibers of a dual fiber pigtail.

16. The WDM coupler of claim 14 wherein:
said first, second and third holding tubes are glass holding tubes.

17. The WDM coupler of claim 14 wherein:
said epoxy is a heat-curing epoxy.

18. The WDM coupler of claim 17 wherein:
said heat curing epoxy is a 353ND heat-curing epoxy.

19. A method for fabricating a WDM coupler comprising steps of
a) attaching a WDM filter to a first GRIN lens by applying a first heat-curing epoxy;
b) inserting and fixing said first GRIN lens attached to said WDM filter into a first holding tube by applying a second heat-curing epoxy;
c) inserting a dual fiber pigtail into a second holding tube then adjusting a relative position between said dual fiber pigtail and said first GRIN lens on an alignment stage to achieve a lowest reflection loss;
d) sliding said second holding tube along said dual fiber pigtail without moving said dual fiber pigtail until said first and second holding tubes are in contact then fixing said first and second holding tubes and said dual fiber pigtail together by applying a third heat curing epoxy;
e) inserting and fixing a second GRIN lens into a third holding tube by applying a fourth heat-curing epoxy;
f) mounting said third holding tube with said second GRIN lens on an alignment stage then inserting a single fiber pigtail into said third holding tube and adjusting and fixing said single fiber pigtail to an optimal position in said third holding tube from said second GRIN lens by applying a fifth heat-curing epoxy;
g) adjusting a relative position of said first GRIN lens to said second GRIN lens until both a lowest overall transmission loss is achieved with said first and third holding tubes in contact; and
h) fixing said first and third holding tubes together by applying a sixth heat-curing epoxy.

20. The method of claim 19 herein: said steps of applying said first, second, third, fourth, fifth and sixth heat-curing epoxies are steps of applying a 353ND epoxy.

21. The method of claim 19 wherein:
said steps of employing said first, second and third holding tubes are steps of employing glass tubes.

22. The method of claim 19 wherein: said step a) of attaching said WDM filter to said first GRIN lens is a step of attaching said WDM filter to said first GRIN lens of 0.23 pitch.

23. The method of claim 19 wherein:
said step b) of inserting and fixing said first GRIN lens attached to said WDM filter into said first holding tube is a step of inserting and fixing said first GRIN lens attached to said WDM filter into said first holding tube having a length of about 5.7 mm, an inside diameter of about 1.8 mm and an outside diameter of about 2.8 mm.

24. The method of claim 19 wherein:
said step c) of inserting said dual fiber pigtail into said second holding tube is a step of inserting said dual fiber pigtail into said second holding tube having a length of about 3 mm, an inside diameter of about 1.8 mm and an outside diameter of about 2.8 mm.

25. The method of claim 19 wherein:

said step e) of inserting said second GRIN lens into said third holding tube is a step of inserting said second GRIN lens of 0.23 pitch into said third holding tube.

26. The method of claim 19, wherein: said step e) of inserting said second GRIN lens into said third holding tube is a step of inserting said second GRIN lens into said third holding tube having a length of about 9 mm, an inside diameter of about 1.8 mm and an outside diameter of about 2.8 mm.

27. The method of claim 19 wherein:

said step f) of inserting said single fiber pigtail into said third holding tube is a step of inserting said single fiber pigtail formed by cutting off one of two fibers of a dual fiber pigtail.

28. A method for fabricating an optical device includes a plurality of optical parts for processing an optical signal transmission therein, comprising steps of:

a) inserting said plurality of optical parts into holding tubes and arranging and adjusting said plurality of optical parts having an optimal position from each other;

b) applying an epoxy for bonding said optical parts in said holding tubes;

c) sliding said holding tubes toward a gap between each of said optical parts and having edges contacting each other; and d) applying an epoxy for bonding said optical parts to said holding tubes and bonding said holding tubes together.

29. The method of claim 28 wherein:

said step a) of inserting said optical parts into said holding tubes includes a step of cutting one of two fibers of a dual fiber pigtail to form a single fiber pigtail and inserting said single fiber pigtail into one of said glass holding tubes.

30. The method of claim 18 wherein:

said step a) of inserting said optical parts into said holding tubes is a step of inserting said optical parts into glass holding tubes.

31. The method of claim 28 wherein:

said step a) of inserting said optical parts into said holding tubes is a step of inserting said optical parts into said holding tubes having inner diameters slightly greater than an outer diameter of said optical parts for slighting and moving along said optical parts.

32. The method of claim 28 wherein:

said step b) of applying an epoxy for bonding said optical parts in said holding tubes, and said step d) of applying an epoxy for bonding said optical parts to said holding tubes and bonding said holding tubes together are steps of applying heat-curing epoxies.

33. The method of claim 32 wherein:

said steps of applying a heat-curing epoxy are steps of applying a 353ND heat-curing epoxy.

34. The method of claim 28 wherein:

said step a) of inserting said optical parts into said holding tubes is a step of inserting said optical parts into said holding tubes having lengths of from 3 to 9 mm, having inner diameters of about 1.8 mm and outer diameters of about 2.8 mm.

* * * * *